(12) United States Patent
Wang et al.

(10) Patent No.: US 11,296,396 B2
(45) Date of Patent: Apr. 5, 2022

(54) ANTENNA WIRING SLEEVE, AND ANTENNA ASSEMBLY PROVIDED WITH WIRING SLEEVE

(71) Applicant: Rosenberger Technology (Kunshan) Co., Ltd, Jiangsu (CN)

(72) Inventors: Kun Wang, Jiangsu (CN); Yan Zhang, Jiangsu (CN); Jing Sun, Jiangsu (CN)

(73) Assignee: ROSENBERGER TECHNOLOGY (KUNSHAN) CO., LTD, Jiangsu (CN)

( * ) Notice: Subject to any disclaimer, the term of this patent is extended or adjusted under 35 U.S.C. 154(b) by 0 days.

(21) Appl. No.: 16/369,665

(22) Filed: Mar. 29, 2019

(65) Prior Publication Data

US 2019/0296421 A1 Sep. 26, 2019

Related U.S. Application Data

(63) Continuation of application No. PCT/CN2018/110757, filed on Oct. 18, 2018.

(30) Foreign Application Priority Data

Mar. 23, 2018 (CN) .......................... 201810247197.7

(51) Int. Cl.
*H01Q 1/14* (2006.01)
*H01Q 21/00* (2006.01)
(Continued)

(52) U.S. Cl.
CPC .............. *H01Q 1/14* (2013.01); *H01Q 1/1242* (2013.01); *H01Q 9/28* (2013.01);
(Continued)

(58) Field of Classification Search
CPC .......... B25D 2250/041; B60R 16/0215; H01B 7/0045; H01Q 1/1242; H02G 3/0437;
(Continued)

(56) References Cited

U.S. PATENT DOCUMENTS 5,703,330 A * 12/1997 Kujawski ............ B60R 16/0215
138/157
5,999,145 A * 12/1999 Niekamp ............. H01Q 1/1242
343/800
(Continued)

FOREIGN PATENT DOCUMENTS

CN       203897663 U     10/2014
CN       106169676 A     11/2016
(Continued)

OTHER PUBLICATIONS

State Intellectual Property Office of the P R. China (ISR/CN), "International Search Report for PCT/CN2018/110757", China, dated Jan. 4, 2019.

(Continued)

*Primary Examiner* — Ricardo I Magallanes
(74) *Attorney, Agent, or Firm* — Locke Lord LLP; Tim Tingkang Xia, Esq.

(57) ABSTRACT

The present invention discloses an antenna wiring sleeve, and an antenna assembly provided with the wiring sleeve. The antenna assembly comprises a pole and several antenna vertically distributed on the pole along the axial direction, each antenna being internally provided with a wiring sleeve mounted on the pole, cables on each antenna passing through the wiring sleeve in the antenna located below and passing along the axial direction of the pole through the antenna located below, each wiring sleeve comprising a sleeve body and a plurality of wiring grooves formed on a side surface of the sleeve body for the cables on the antenna to pass through. The wiring sleeve is additionally arranged on the antenna pole so as to axially wire the antenna cables along the outside of the pole, thereby saving space, achieving an aesthetically pleasing and neat appearance, and facilitating assembly.

10 Claims, 8 Drawing Sheets

(51) Int. Cl.
  *H02G 3/04* (2006.01)
  *H01Q 1/12* (2006.01)
  *H01Q 9/28* (2006.01)
  *B60R 16/02* (2006.01)
  *F16L 3/06* (2006.01)

(52) U.S. Cl.
  CPC ........... *H01Q 21/0056* (2013.01); *H02G 3/04* (2013.01); *B25D 2250/041* (2013.01); *B60R 16/0215* (2013.01); *F16L 3/06* (2013.01)

(58) Field of Classification Search
  CPC .......... H02G 15/076; H02G 3/30; H02G 3/32; H02G 3/0481; F16L 3/06
  See application file for complete search history.

(56) References Cited

U.S. PATENT DOCUMENTS

| | | | |
|---|---|---|---|
| 2011/0156984 A1* | 6/2011 | Caldwell | H01Q 1/1207 343/890 |
| 2018/0076603 A1* | 3/2018 | Harwath | H01R 4/36 |

FOREIGN PATENT DOCUMENTS

| | | | |
|---|---|---|---|
| CN | 206595659 U | 10/2017 | |
| CN | 107323374 A | 11/2017 | |
| DE | 202009002644 U1 * | 6/2009 | ............... F16L 3/06 |
| EP | 1566858 A1 | 8/2005 | |
| WO | 0076022 A1 | 12/2000 | |
| WO | WO-2012168292 A2 * | 12/2012 | ........... G02B 6/4441 |

OTHER PUBLICATIONS

Communication under Rules.
European Patent Office, Communication, dated Mar. 19, 2021, Germany.
European Patent Office, Communication, dated Apr. 8, 2021, Germany.
Information on Search strategy.
Supplementary European Search Report, dated Mar. 12, 2021.

* cited by examiner

ANTENNA WIRING SLEEVE, AND ANTENNA ASSEMBLY PROVIDED WITH WIRING SLEEVE

CROSS REFERENCE TO RELATED APPLICATIONS

This application is a continuation of International Application No. PCT/CN2018/110757, filed on Oct. 18, 2018, which claims priority to Chinese Patent Application No. 201810247197.7, filed on Mar. 23, 2018, the disclosures of which are hereby incorporated by reference.

FIELD OF THE INVENTION

The present invention relates to an antenna assembly, in particular to an antenna wiring sleeve.

BACKGROUND

Most of commercially available cables are disposed on the periphery of a product, or are disposed inside a pole in the course of wiring. The wiring mode in which the cables are disposed on the periphery of the product will affect the product performances, and occupy the external space, accompanied with unaesthetic appearance. The wiring mode in which the cables are disposed inside the pole will occupy the internal space of the pole, and the wiring operation and mounting are difficult because the pole needs to be drilled with holes.

SUMMARY OF THE INVENTION

An objective of the present invention is to overcome the defects of the prior art, and provide an antenna wiring sleeve which saves space, achieves an aesthetically pleasing and neat appearance, and facilitates assembly, and an antenna assembly provided with the antenna wiring sleeve.

To fulfill said objective, the present invention provides the following technical solution: an antenna wiring sleeve which is mounted on an antenna pole comprises a sleeve body and a plurality of wiring grooves formed on a side surface of the sleeve body for the cables on the antenna to pass through; each wiring groove is axially distributed on a side surface of the sleeve body, and the plurality of wiring grooves is uniformly distributed on the side surface of the sleeve body in the circumferential direction.

Preferably, each wiring groove comprises a cable accommodating space and a limiting space which are integrated and allow cables on the antenna to pass through; and the limiting space is formed by shrinking inwards from the outer end of the cable accommodating space, to limit the antenna passing through the wiring groove in the cable accommodating space.

Preferably, the cable accommodating space is a semi-arc-shaped space whose diameter is slightly larger than the diameter of the antenna cable, and the width of one end of the limiting space close to the cable accommodating space is slightly smaller than the diameter of the antenna cable.

The present invention further provides a further technical solution: an antenna assembly provided with the wiring sleeve comprises a pole and a plurality of antenna vertically distributed on the pole along the axial direction, wherein each antenna is internally provided with a wiring sleeve mounted on the pole; cables on each antenna pass through the wiring sleeve in the antenna located below and pass along the outside of the pole through the antenna located below in the axial direction; each wiring sleeve comprises a sleeve body and a plurality of wiring grooves formed on a side surface of the sleeve body for the cables on the antenna to pass through; each wiring groove is axially distributed on the outside surface of the sleeve body; and the plurality of wiring grooves is uniformly distributed on the outside surface of the sleeve body in the circumferential direction.

Preferably, except for the antenna located at the topmost of the pole, the remaining antennas on the pole are internally provided with the wiring sleeve respectively.

Preferably, each wiring sleeve is further sleeved with an encapsulating casing which is located in the corresponding antenna.

Preferably, the antenna assembly further comprises a supporting member mounted at the lower end of the antenna, and the supporting member is secured to the pole.

Preferably, the supporting member comprises an upper supporting surface, a lower end surface and a plurality of supporting portions connecting the upper supporting surface and the lower end surface; each supporting portion comprises a first portion extending downwards from the upper supporting surface, a connecting portion bent inwards from the first portion and a second portion extending downwards from the connecting portion to the lower end surface.

The present invention has the following beneficial effects: a wiring sleeve is additionally arranged on the antenna pole, and the antenna cables on the pole are disposed outside the wiring sleeve, such that the antenna cables are axially wired along the outside of the pole. Compared with an existing wiring structure in which cables are directly disposed on the periphery of a product, in the present invention, the antenna cables are constrained in the wiring grooves of the wiring sleeve, and therefore the wiring space is basically not occupied, and the wiring is distinct, without affecting the product performances. The problem of the difficulty in wiring is also solved for customers. In addition, the wiring sleeve is sleeved on the pole and is thus replaced conveniently. Moreover, waterproof structures at two ends of the antenna are concise and practical.

Figure 1:
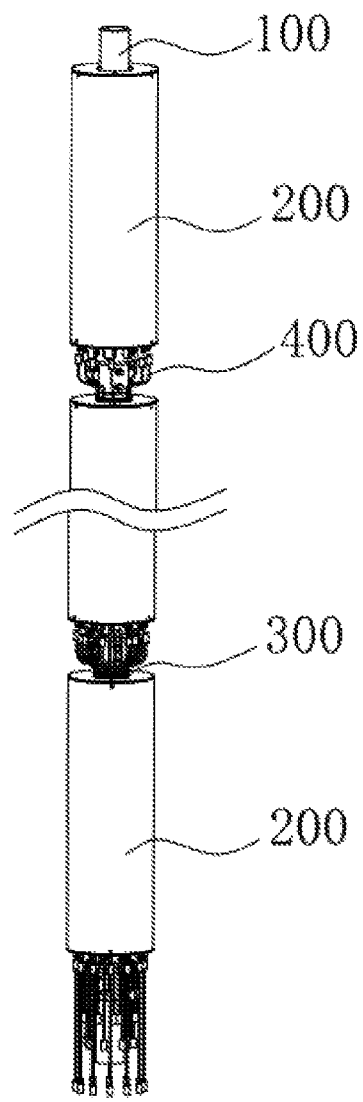
FIG. 1 is a schematic structural diagram after an antenna assembly according to an embodiment of the present invention is assembled.

Reference numerals represent the following components: 100—pole; 200—antenna; 201—antenna housing; 202—cover plate; 203—through hole; 204—cable connector;

300—wiring sleeve; 301—sleeve body; 302—wiring groove; 303—cable accommodating space; 304—limiting space; 400—antenna cable; 500—encapsulating casing; 600—supporting member; 601—upper supporting surface; 602—lower supporting surface; 603—supporting portion; 604—hollow portion; 605—first portion; 606—connecting portion; 607—second portion.

DETAILED DESCRIPTIONS OF THE PREFERRED EMBODIMENTS

The technical solutions of the embodiments of the present invention will be clearly and completely described below with reference to the accompanying drawings.

According to the antenna wiring sleeve and the antenna assembly provided with the wiring sleeve as disclosed by the present invention, the wiring sleeve is additionally arranged on a pole, and antenna cables on the pole are disposed outside the wiring sleeve and pass through the antenna, such that the antenna cables are axially wired along the outside of the pole, thereby saving space, achieving an aesthetically pleasing and neat appearance, and facilitating assembly.

Figure 2:
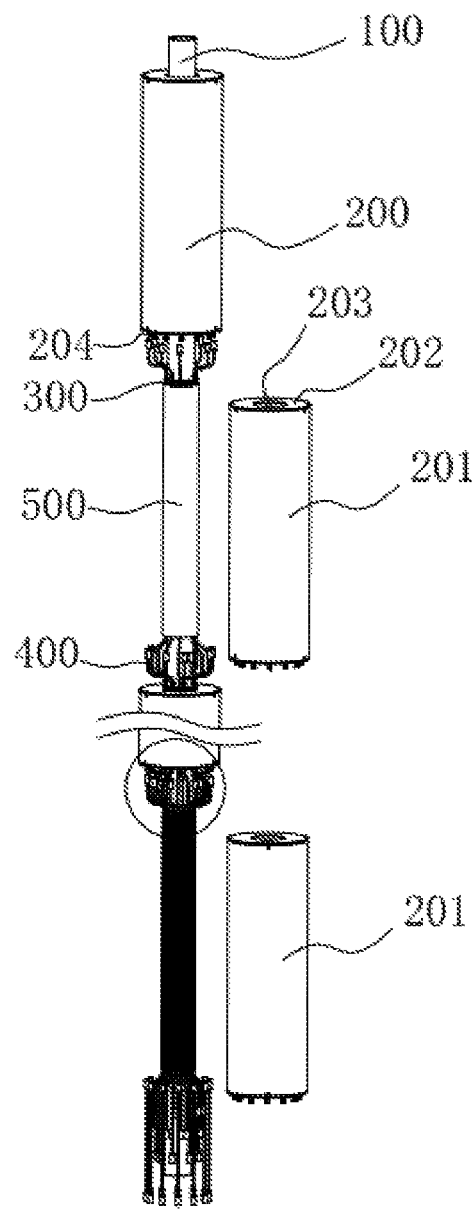
FIG. 2 is a partially exploded schematic structural diagram according to the antenna assembly of the embodiment of the present invention.
Figure 3:
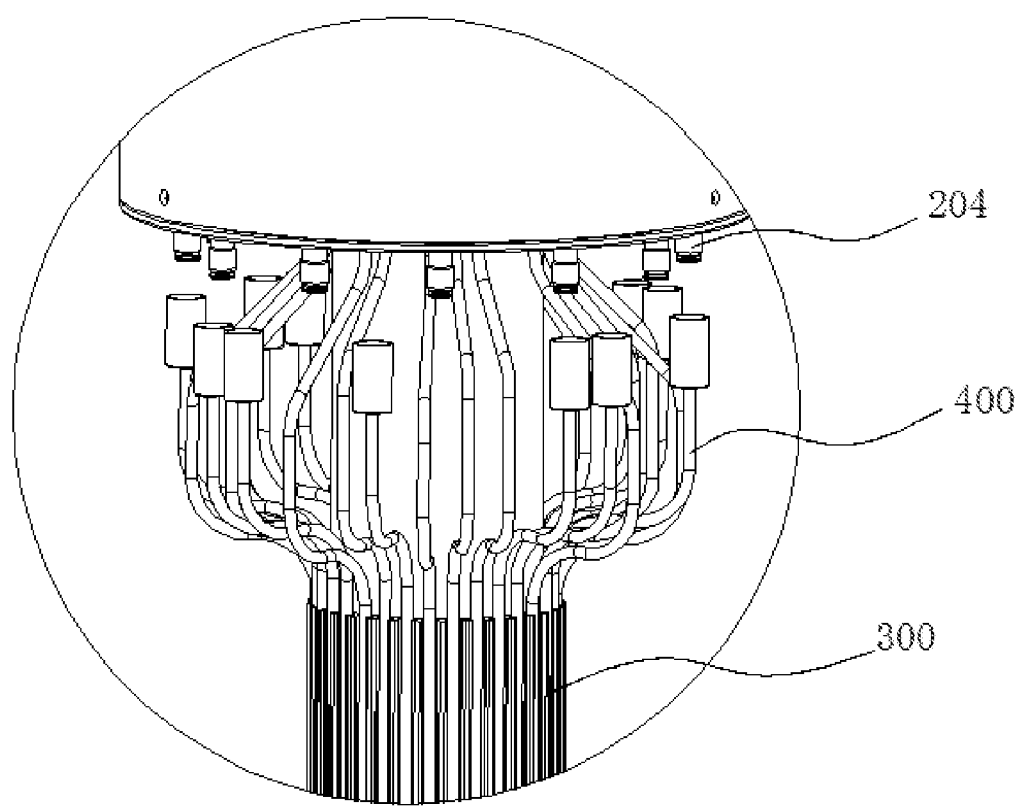
FIG. 3 is an enlarged structural schematic diagram of a portion circled in FIG. 2.

As shown in FIGS. 1, 2 and 3, an embodiment of the present invention discloses an antenna assembly. The antenna assembly comprises a pole 100, a plurality of antenna 200 and a plurality of wiring sleeves 300. The plurality of antenna 200 are mounted on the pole 100, and are vertically distributed along the axial direction of the pole 100. Except for the antenna 200 positioned on the topmost of the pole 100, the remaining antennas 200 on the pole 100 are internally provided with a wiring sleeve 300 respectively. The cable 400 of the upper antenna 200 passes through the wiring sleeve 300 in the lower antenna 200 and is axially wired by passing through the lower antenna 200 along the outside of the pole 100.

Specifically, in the present embodiment, the pole 100 is integrally formed in a strip-shaped cylinder structure for fixing the antenna 200.

As shown in FIG. 2, each antenna 200 comprises a hollow antenna housing 201 and cover plates 202 disposed on the upper end surface and the lower end surface of the antenna housing 201, wherein each of the upper and lower cover plates 202 is provided with a through hole 203 for the pole 100 to pass through, and the two through holes 202 correspond in position and are generally formed in the center of the cover plate 202. Each antenna 200 is sleeved on the pole 100 through the two through holes 203. In this embodiment, the antenna housing 201 is in, but not limited to, a hollow cylindrical shape.

As shown in FIG. 2, a plurality of cable connectors 204 for connection of cables are disposed on the cover plate 202 at the lower end of the antenna housing 201. Each cable connector 204 corresponds to one antenna cable 400.

Figure 4:
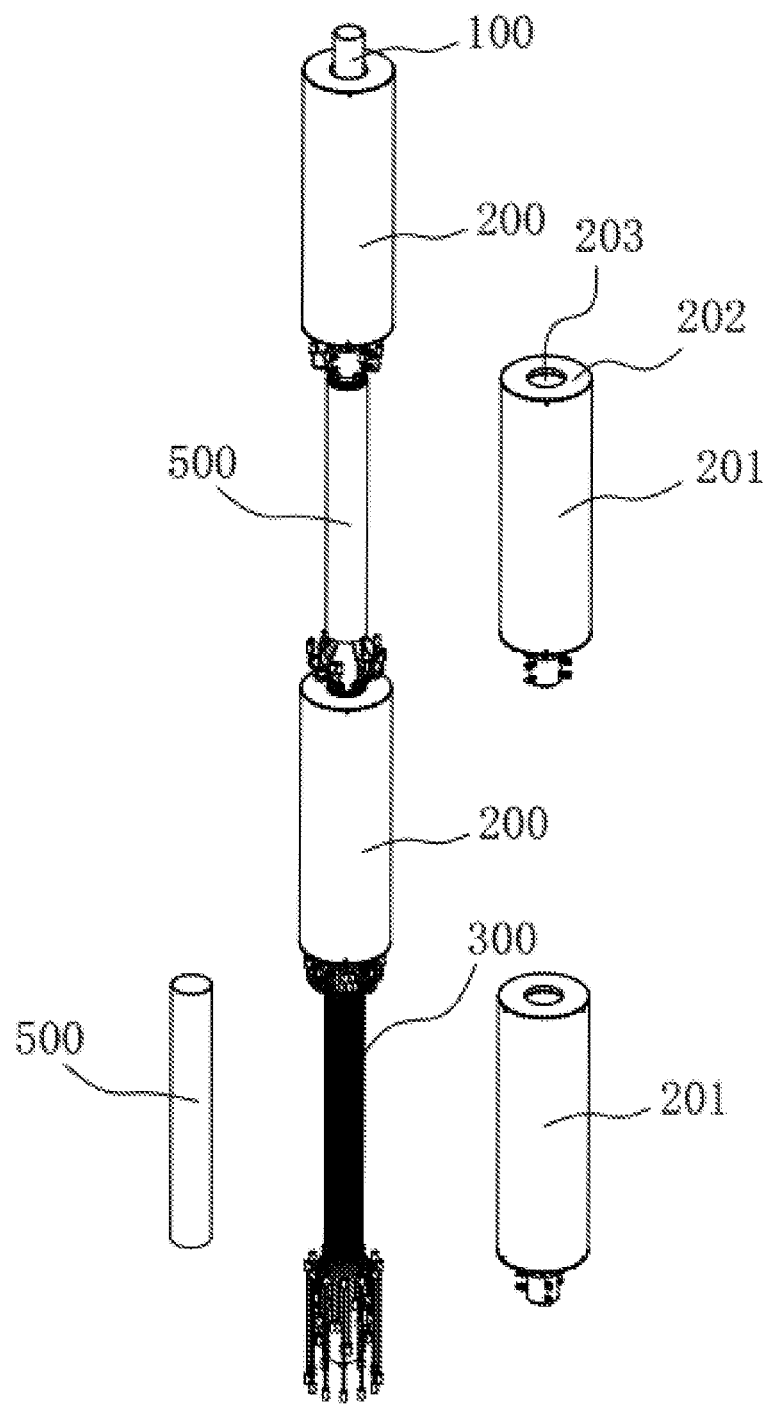
FIG. 4 is partially exploded schematic structural diagram of the antenna assembly according to the embodiment of the present invention.

As shown in FIGS. 2 to 4, each wiring sleeve 300 comprises a sleeve body 301 and a plurality of wiring grooves 302 formed in the sleeve body 301. In this embodiment, the sleeve body 301 is of a hollow cylindrical tubular structure in conjunction with the shape of the pole 100, is sleeved on the pole 100 and is positioned inside the antenna housing 201 of the antenna.

Figure 6:
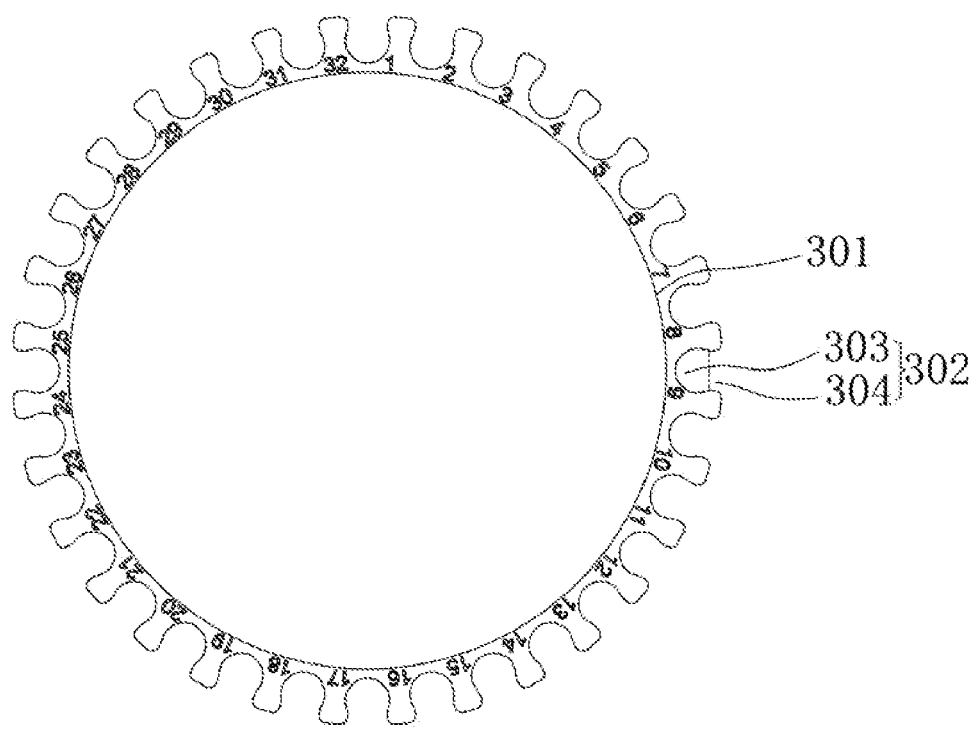
FIG. 6 is schematic structural top view of FIG. 5.

As shown in FIG. 3, each wiring groove 302 is axially distributed on the outside surface of the sleeve body; and the plurality of wiring grooves 302 is uniformly distributed on the outside surface of the sleeve body 301 in the circumferential direction. In this embodiment, the wiring grooves 302 are uniformly distributed on the sleeve body 301. Each wiring groove 302 allows one antenna cable 400 to pass through. Of course, each wiring groove 302 may also allow more than one cable to pass through, but from the viewpoint of saving wiring space, it is preferable to allow one antenna cable 400 to pass through. It is also possible that the wiring grooves 302 in the wiring sleeve 300 may be vacant. As shown in FIG. 6, in this embodiment, wiring grooves 302 are formed in the sleeve body 301 of the wiring sleeve, and the wiring sleeve 300 may be made of aluminum alloy or plastic.

Figure 5:
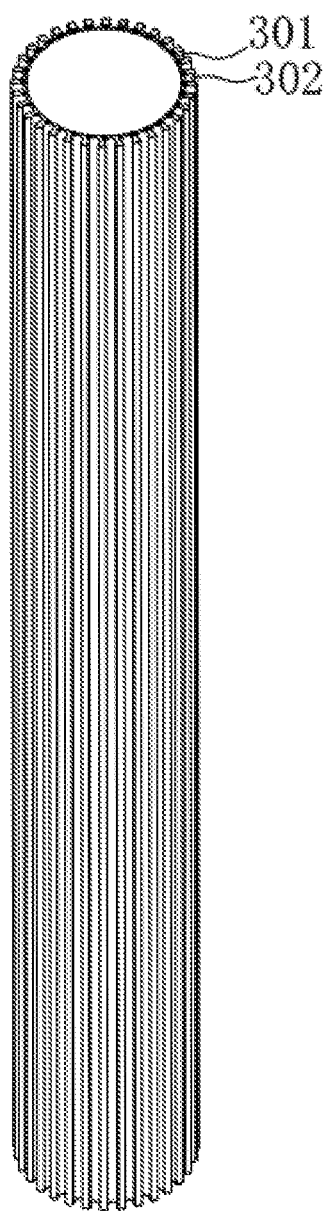
FIG. 5 is a schematic structural diagram of a wiring sleeve according to the embodiment of the present invention.

In this embodiment, as shown in FIG. 5 and FIG. 6, each wiring groove 302 specifically comprises a cable accommodating space 303 and a limiting space 304 which are integrated and communicated with each other, wherein the cable accommodating space 303 is disposed close to the outside surface of the sleeve body 301 and allows the antenna cables 400 to pass through. In this embodiment, the cable accommodating space 303 is, but not limited to, a semi-arc-shaped space. When the cable accommodating space 303 allows one antenna cable 400 to pass through, the diameter of the cable accommodating space 303 is slightly larger than the diameter of the antenna cable 400.

The limiting space 304 is disposed outside the cable accommodating space 303, is formed by shrinking inwards from the end outside the cable accommodating space 303 and used to limit the antenna cables 400 passing through the wiring groove 302 in the cable accommodating space 303. In this embodiment, it is set that the width of one end of the limiting space 304 close to the cable accommodating space 303 is slightly smaller than the diameter of each antenna cable 100, such that the antenna cables 400 can be limited in the cable accommodating space 303. The other end of the limiting space 304 is in an open state. Of course, the wiring space 302 is not limited to the structure described herein, and other structures that allow the antenna cables 400 to pass through are also applicable to the present invention.

Furthermore, as shown in FIGS. 2 and 4, the wiring sleeve 300 is further sleeved with an encapsulating casing 500 whose shape corresponds to the shape of the sleeve body 301 of the wiring sleeve 302. The encapsulating casing 500 is integrally in, but not limited to, a hollow cylindrical structure having an open upper end and an open lower end. The encapsulating casing 500 is sleeved outside the wiring sleeve 300, and has the same function as the limiting space 304, i.e., limiting the antenna cables 400 inside the cable accommodating space 303 on the one hand; and on the other hand, the encapsulating casing 500 plays a role of isolating and shielding the previous antenna cable 400 from the antenna 200 passed thereby.

Figure 7:
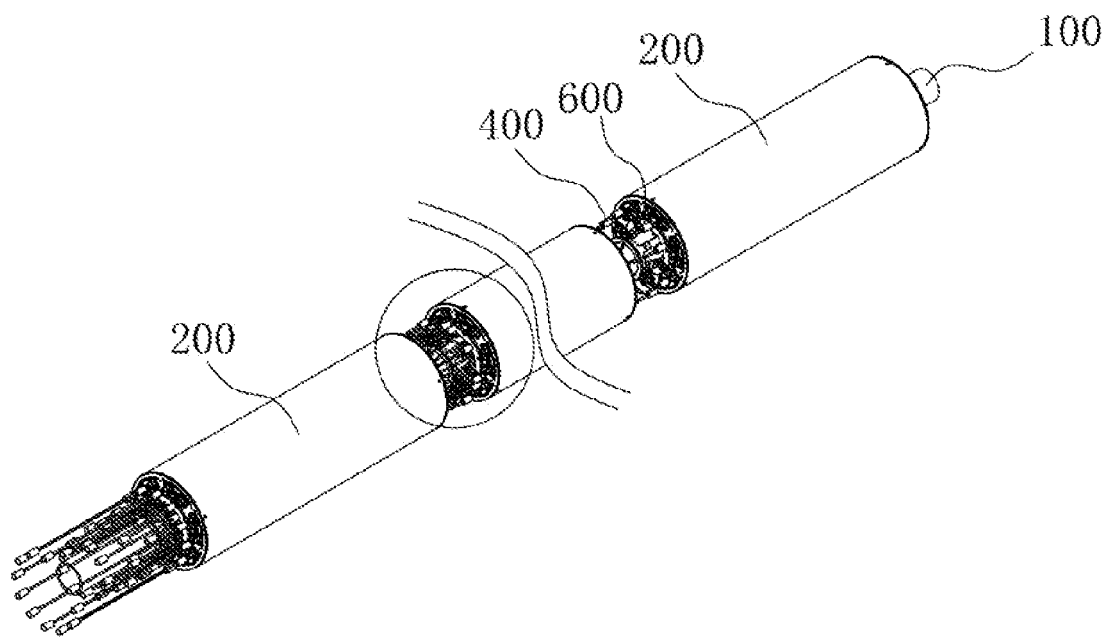
FIG. 7 is a schematic structural diagram after an antenna assembly according to a further embodiment of the present invention is assembled.
Figure 8:
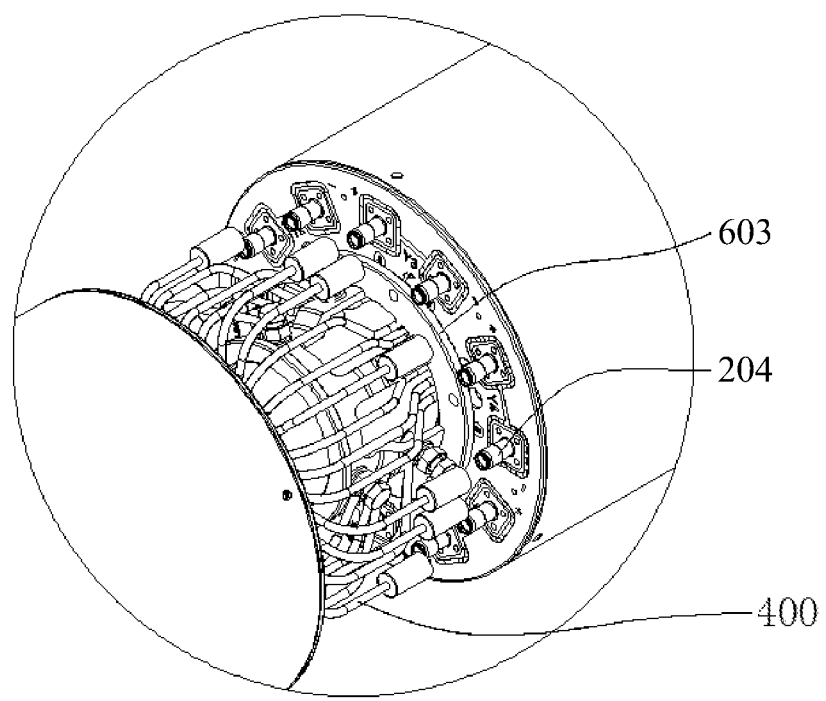
FIG. 8 is an enlarged schematic structural diagram circled in FIG. 7.
Figure 9:
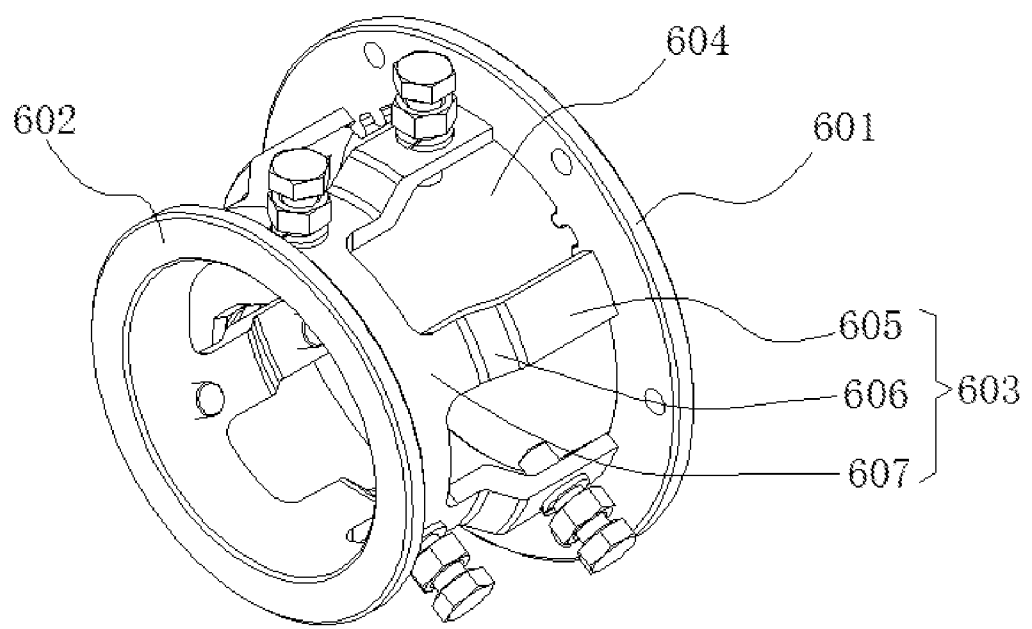
FIG. 9 is a schematic structural diagram of a supporting member according to a further embodiment of the present invention.

In addition, a mounting clearance is formed between the two upper and lower antennas 200 adjacent to each other. Preferably, as shown in FIG. 7 and FIG. 8, a supporting member 600 is disposed inside the mounting clearance. The supporting member 600 is fixed on the pole 100. In this embodiment, as shown in FIG. 9, the supporting member 600 specifically comprises a hollow integrated upper supporting surface 601, a lower end surface 602 and a plurality of supporting portions 603 connecting the upper supporting surface 601 and the lower end surface 602. The diameter of the hollow portion of the upper support surface 601 is larger than the diameter of the hollow portion of the lower end surface 602, such that the inner wall of the lower end surface 602 is attached to the pole 100. Each supporting portion 603 comprises a first portion 605 extending downwards from the upper supporting surface 601, a connecting portion 606 bent inwards from the first portion 605, and a second portion 607 extending downwards from the connecting portion 606, and a hollow portion 604 is formed between the adjacent portions 603. Each antenna cable 400 extends downwards from the hollow portion 604 of the upper supporting surface 601 through the hollow portion 604. Therein, the upper supporting surface 601 is fixed to the cover plate 202 at the lower end of the antenna 200 by screws, and part of the supporting portion 603 is fixed to the pole 100 by screws. The screws are respectively fixed to the first portion 605 and the second portion 607 of the supporting portion 603, thereby fixing the entire antenna 200 to the pole 100.

In this way, when the antennas are wired, one end of the cable 400 on the upper antenna is connected to the cable connector 204 of the antenna, and the other end of the cable 400 extends downwards and passes through the lower antenna via the corresponding wiring groove 302 on the wiring sleeve 300 in the lower antenna. The cable 400 on the lowermost antenna is connected to a device (not shown) on the ground below the cable 400. In this case, the wiring is distinct, and the cables 400 are limited in the wiring grooves 302, without occupying the wiring space and affecting the product performances. The problem of the difficulty in wiring is also solved for customers. In addition, the wiring sleeves 300 are sleeved on the pole 100 and are thus replaced conveniently.

The technical content and technical features of the present invention have been disclosed as above, and those skilled in the art can still make various substitutions and modifications without departing from the teaching and disclosure of the present invention. Therefore, the protection scope of the present invention should not be limited to the contents disclosed in the embodiments, but should include various substitutions and modifications without departing from the present invention, and should be covered by the claims of this patent application.

The invention claimed is:

1. An antenna assembly, comprising:
   a pole; and
   a plurality of antenna vertically distributed on the pole along the axial direction, wherein each antenna has an antenna housing and is internally provided with a wiring sleeve mounted on the pole and an encapsulating casing disposed between the antenna housing and the wiring sleeve; cables on each antenna pass through the wiring sleeve in the antenna located below and pass along the outside of the pole through the antenna located below in the axial direction, such that the encapsulating casing and the wiring sleeve limit the cables therebetween; each wiring sleeve comprises a sleeve body and a plurality of wiring grooves formed on a circumferential side surface of the sleeve body for the cables on the antenna to pass through; all of the wiring grooves are formed on the circumferential side surface of the sleeve body and there is no wiring groove formed on an inner portion of the sleeve body, each wiring groove is axially distributed on the circumferential side surface of the sleeve body; and the plurality of wiring grooves are uniformly distributed on the whole circumferential side surface of the sleeve body in the circumferential direction; and
   a supporting member mounted at the lower end of the antenna, wherein the supporting member is secured to the pole, the supporting member comprises an upper supporting surface, a lower end surface and a plurality of supporting portions connecting the upper supporting surface and the lower end surface; the supporting portion comprises a first portion extending vertically straightly downwards from the upper supporting surface, a connecting portion bent inwards from the first portion and a second portion extending vertically straightly downwards from the connecting portion to the lower end surface.

2. The antenna assembly according to claim 1, wherein except for the antenna located at a topmost location of the pole, the remaining antennas on the pole are internally provided with the wiring sleeve respectively.

3. The antenna assembly according to claim 1, wherein each wiring groove comprises a cable accommodating space and a limiting space, the cable accommodating space and the limiting space are integrated and allow the cables on the antenna to pass through, the limiting space is formed by shrinking inwards from the outer end of the cable accommodating space, and the cables passing through the wiring groove are limited in the cable accommodating space.

4. The antenna assembly according to claim 3, wherein the cable accommodating space is a semi-arc-shaped space, a diameter of the cable accommodating space is larger than a diameter of a corresponding one of the cables on the antenna; and a width of one end of the limiting space close to the cable accommodating space is smaller than the diameter of the corresponding cable.

5. The antenna assembly according to claim 1, wherein a total quantity of the wiring grooves is greater than or equal to a total quantity of the cables on the plurality of antennas, and each wiring groove allows at most one of the cables to pass through.

6. The antenna assembly according to claim 3, wherein the limiting space is located on an outer end of the cable accommodating space in a radial direction extending from the antenna pole, and in each wiring groove, a size of the cable accommodating space is greater than a size of the limiting space.

7. The antenna assembly according to claim 1, wherein the antenna housing and the encapsulating casing are both in hollow cylindrical shapes, and a diameter of the antenna housing is greater than a diameter of the encapsulating casing.

8. The antenna assembly according to claim 1, wherein the connecting portion extends obliquely straightly downwards from the first portion to the second portion, and the connecting portion is not in parallel to the first portion and the second portion.

9. The antenna assembly according to claim 1, wherein a diameter of the upper support surface is greater than a diameter of the lower end surface.

10. The antenna assembly according to claim 1, wherein the supporting member further comprises a plurality of hollow portions, each of the hollow portions is located between two adjacent ones of the supporting portions, and each cable on each antenna extends downwards through a corresponding one of the hollow portions.

* * * * *